(12) United States Patent
Hotmer (10) Patent No.: US 6,722,318 B2
(45) Date of Patent: Apr. 20, 2004

(54) ANIMAL COMMUNICATION DEVICE (76) Inventor: Roger Hotmer, 4270 Laurel Grove Trace, Suwanee, GA (US) 30024

( * ) Notice: Subject to any disclaimer, the term of this patent is extended or adjusted under 35 U.S.C. 154(b) by 0 days.

(21) Appl. No.: 10/445,021

(22) Filed: May 27, 2003

(65) Prior Publication Data

US 2003/0230248 A1 Dec. 18, 2003

Related U.S. Application Data (63) Continuation-in-part of application No. 10/076,388, filed on Feb. 19, 2002, now abandoned.
(51) Int. Cl.[7] .......................... A01K 15/00; A01K 15/02
(52) U.S. Cl. ..................... 119/712; 119/719; 119/908
(58) Field of Search .................... 119/712, 719, 119/908

(56) References Cited

U.S. PATENT DOCUMENTS

| 3,847,120 | A | * | 11/1974 | Hicks | 119/713 |
|---|---|---|---|---|---|
| 4,194,620 | A | * | 3/1980 | Soloway | 119/712 |
| 6,311,644 | B1 | * | 11/2001 | Pugh | 119/712 |
| 6,615,770 | B2 | * | 9/2003 | Patterson et al. | 119/719 |
| 6,651,592 | B2 | * | 11/2003 | Maddox et al. | 119/712 |

* cited by examiner

*Primary Examiner*—Charles T. Jordan
*Assistant Examiner*—Elizabeth Shaw
(74) *Attorney, Agent, or Firm*—Stites & Harbison, PLLC; Ross F. Hunt, Jr.

(57) ABSTRACT

An animal communication device is provided which is designed to solicit animal responses based on at least two of the five major senses. The device includes a module having associated therewith a plurality of physically perceivable attributes related to the senses. The animal activates the device by depressing a housing cover which activates a switch. Alternatively, a motion detector is used to detect the presence of the animal. In both instances, a record/playback device is activated so that a pre-recorded message which corresponds to the physically perceivable attributes of the module is then played back.

19 Claims, 9 Drawing Sheets

ANIMAL COMMUNICATION DEVICE

CROSS REFERENCE TO RELATED APPLICATIONS

This application is a continuation-in-part of U.S. application Ser. No. 10/076,388, filed on Feb. 19, 2002 now abandoned.

BACKGROUND OF THE INVENTION

1. Field of the Invention

The present invention generally relates to an animal communication device, and in particular, to an animal communication device designed to solicit animal responses based on a stimulus of a plurality of the five major senses.

2. Background of the Invention

Researchers and animal lovers alike have long been interested in designing means of facilitating communication with animals. This has led to many attempts to create devices which allow for communication between animals and humans. Normally, these devices will appeal to one of an animal's senses in order to solicit a desired response. Once the animal has responded, the device then indicates the desired response has been received. This indication can take many forms such as playing a pre-recorded message, rewarding the animal, e.g., with a treat, or employing various other types of audio and/or visual indicators.

Examples of prior art animal communication devices are those disclosed in U.S. Pat. Nos. 6,240,880; 5,604,478; 6,094,139 and 5,392,735. While each of these devices facilitate some form of communication between humans and animals, the device all suffer from various limitations and disadvantages. For example, each of these devices is limited in usefulness since, inter alia, most typically only appeal to one of an animal's senses. This limitation can render a communication device useless in cases where an animal loses a particular sense, such as sight, for which the particular device is designed and, more generally, limits the applicability and appeal of the device. In this regard, another limitation of most of those devices which only appeal to one sense is that, because of this limitation, the device cannot be used with more than one animal since different animals typically have varying abilities with respect to senses of sight, smell, taste, etc.

BRIEF SUMMARY OF THE INVENTION

In accordance with the present invention, an animal communication device is provided which affords a number of advantages and although not limited to such an application, has particular appeal, for example, to both pets and pet owners.

In accordance with one aspect of the invention, there is provided an animal communication device for enabling a land animal to communicate with a human, said device comprising:

a primary module, comprising a housing and a housing cover mounted on said housing so as to be movable thereto in response to depression of the cover by the animal, said primary module having associated therewith a plurality of physically perceivable attributes selected from the group consisting of sight, smell, sound, taste, and touch;

a speech unit disposed within said housing, said speech unit comprising a playback device for storing and playing back a recorded message and a speaker for broadcasting said recorded message, said recorded message comprising a message to be communicated by the animal to a human listener and said message being related to said plurality of said physically receivable attributes associated with the primary module; and a control switch, connected to said speech unit and disposed within said housing so as to be actuated by depression of said cover, for activating said playback device to cause playing back of said message in response to depression of said housing cover by the animal.

Preferably, the animal communication device further comprises a panel, the panel is disposed on an upper surface of said housing cover, and the panel has associated therewith at least one of said plurality of physically perceivable attributes.

Advantageously, the panel is shaped and designed so as to present a sight stimulus. In one preferred implementation, the panel incorporates a scented element providing a smell stimulus. Alternatively, or in addition, the panel includes at least one textured portion providing a touch stimulus.

Preferably, two or more of the sight stimulus, smell stimulus and touch stimulus relate to a common animal-related request reflected in said message. In one important embodiment, the common request is the need to eat and a corresponding recorded message is played back responsive to actuation of said switch. In another important embodiment, the common request is the need to go out and a corresponding message is played back responsive to actuation of said switch.

Advantageously, the animal communication device further comprises spring means for resiliently supporting said cover in spaced relation to an upper portion in said housing so as to enable depression of said cover relative to the housing. Preferably, the cover includes a recessed bottom surface and said spring means includes at least one coil spring adapted to engage said recessed bottom surface.

Preferably, the animal communication device further comprises means for enabling recording of a recorded message by said playback device in a record mode for playback by said playback device in a play mode. Advantageously, the animal communication device further comprises a further switch for controlling switching between said record mode and said playback mode.

In an advantageous implementation, the animal communication device further comprises a second module connected to the primary module, said second module having associated therewith a plurality of physically perceivable attributes selected from the group consisting of sight, smell, sound, taste, and touch, said physically perceivable attributes of said first and second modules relating to different animal-related themes.

In accordance with a further aspect of the invention, there is provided the animal communication device for enabling an animal to communicate with a human, the device comprising:

a primary module, comprising a housing and a housing cover mounted on said housing so as to be movable thereto in response to depression of the cover by the animal, said primary module having associated therewith at least one physically perceivable attribute related to the need of the animal to eat and selected from the group consisting of sight, smell, sound, taste, and touch;

a speech unit disposed within said housing, said speech unit comprising a playback device for storing and playing back a recorded message reflecting the need of the animal to eat and a speaker for broadcasting said recorded message; and a control switch, connected to said speech unit and disposed within said housing so as to be actuated by depression of said cover by the animal, for activating said playback device to play said recorded message in response to depression of said housing cover by the animal.

In accordance with a still further aspect of the invention, there is provided an animal communication device for enabling an animal to communicate with a human comprising:

a primary module, comprising a housing and a housing cover mounted on said housing so as to be movable thereto in response to depression of the cover by the animal, said primary module having associated therewith at least one physically perceivable attribute related to the need of the animal to go out and selected from the group consisting of sight, smell, sound, taste, and touch;

a speech unit disposed within said housing, said speech unit comprising a playback device for storing and playing back a recorded message reflecting the need of the animal to go out and a speaker for broadcasting said recorded message; and a control switch, connected to said speech unit and disposed within said housing so as to be actuated by depression of said cover by the animal, for activating said playback device to play said recorded message in response to depression of said housing cover by the animal.

According to another aspect of the invention, there is provided an animal communication device comprising:

a primary module, comprising a housing and a housing cover mounted on said housing so as to be movable thereto in response to depression of the cover, said primary module having associated therewith a plurality of physically perceivable attributes selected from the group consisting of sight, smell, sound, taste, and touch;

a speech unit disposed within said housing, said speech unit comprising a playback device for storing and playing back a recorded message and a speaker for broadcasting said recorded message; and a control switch, connected to said speech unit and disposed within said housing so as to be actuated by depression of said cover, for activating said playback device in response to depression of said housing cover, said device further comprising a second module connected to the primary module, said second module having associated therewith a plurality of physically perceivable attributes selected from the group consisting of sight, smell, sound, taste, and touch, and said physically perceivable attributes of said first and second modules relating to different animal-related themes.

According to a further aspect of the invention, there is provided an animal communication device for enabling a land animal to communicate with a human, said device comprising:

a primary module comprising a housing and having associated therewith a plurality of physically perceivable attributes selected from the group consisting of sight, smell, sound, taste, and touch;

a speech unit disposed within said housing, said speech unit comprising a playback device for storing and playing back a recorded message and a speaker for broadcasting said recorded message, said recorded message comprising a message to be communicated by the animal to a human listener and said message being related to said plurality of said physically receivable attributes associated with the primary module; and a motion detector, connected to said speech unit and disposed within said housing, for activating said playback device to cause playing back of said message in response to detection of the animal.

Preferably, the animal communication device of this embodiment further comprises a panel, the panel is disposed on an upper surface of said housing, and the panel has associated therewith at least one of said plurality of physically perceivable attributes.

In one embodiment, the panel is shaped and designed so as to present a sight stimulus. In another embodiment, the panel incorporates a scented element providing a smell stimulus. Alternatively, in addition, the panel includes at least one textured portion providing a touch stimulus.

Preferably, two or more of the sight stimulus, the smell stimulus and the touch stimulus relate to a common animal-related request reflected in said message. In one important embodiment, the common request is the need to eat and a corresponding recorded message is played back responsive to detection of the animal. In another important embodiment, the common request is the need to go out and a corresponding message is played back responsive to detection of the animal.

Preferably, the animal communication further comprises means for enabling recording of a recorded message by said playback device in a record mode for playback by said playback device in a play mode. Advantageously, the animal device further comprises a switch for controlling switching between said record mode and said playback mode.

In an advantageous implementation, the animal communication device further comprises a second module connected to the primary module, said second module having associated therewith a plurality of physically perceivable attributes selected from the group consisting of sight, smell, sound, taste, and touch, said physically perceivable attributes of said first and second modules relating to different animal-related themes.

According to yet another aspect of the invention, there is provided an animal communication device for enabling an animal to communicate with a human, said device comprising:

a primary module, comprising a housing and having associated therewith at least one physically perceivable attribute related to the need of the animal to eat and selected from the group consisting of sight, smell, sound, taste, and touch;

a speech unit disposed within said housing, said speech unit comprising a playback device for storing and playing back a recorded message reflecting the need of the animal to eat and a speaker for broadcasting said recorded message; and a motion detector, connected to said speech unit and disposed within said housing, for activating said playback device to play said recorded message in response to detection of the animal.

In accordance with a still further aspect of the invention, there is provided an animal communication device for enabling an animal to communicate with a human comprising:

a primary module, comprising a housing and having associated therewith at least one physically perceivable attribute related to the need of the animal to go out and selected from the group consisting of sight, smell, sound, taste, and touch;

a speech unit disposed within said housing, said speech unit comprising a playback device for storing and playing back a recorded message reflecting the need of the animal to go out and a speaker for broadcasting said recorded message; and a motion detector, connected to said speech unit and disposed within said housing, for activating said playback device to play said recorded message in response to detection of the animal.

According to another aspect of the invention, there is provided an animal communication device comprising:

a primary module, comprising a housing and having associated therewith a plurality of physically perceivable attributes selected from the group consisting of sight, smell, sound, taste, and touch;

a speech unit disposed within said housing, said speech unit comprising a playback device for storing and playing back a recorded message and a speaker for broadcasting said recorded message; and a motion detector, connected to said speech unit and disposed within said housing, for activating said playback device in response to detection of the animal, said device further comprising a second module connected to the primary module, said second module having associated therewith a plurality of physically perceivable attributes selected from the group consisting of sight, smell, sound, taste, and touch, and said physically perceivable attributes of said first and second modules relating to different animal-related themes.

Further features and advantages of the present invention will be set forth in, or apparent from, the detailed description of preferred embodiments thereof which follows.

DETAILED DESCRIPTION OF THE INVENTION

Referring to FIGS. 1 to 7, wherein like numerals represent the same elements throughout the several views, there is shown a first preferred embodiment of the animal communication device of the invention. The device, which is generally denoted 10, includes a housing module or housing 12 including a cover 14, side walls 16 and end walls 18. In the embodiment illustrated, housing 12 is of a rectangular shape but may also be of other shapes including rounded or curved configurations. The housing 12 is preferably constructed of a hard plastic or the like but may be constructed of any material which is rugged or sturdy enough to withstand the weight of an animal depressing cover 14, in the manner described below.

Figure 3:
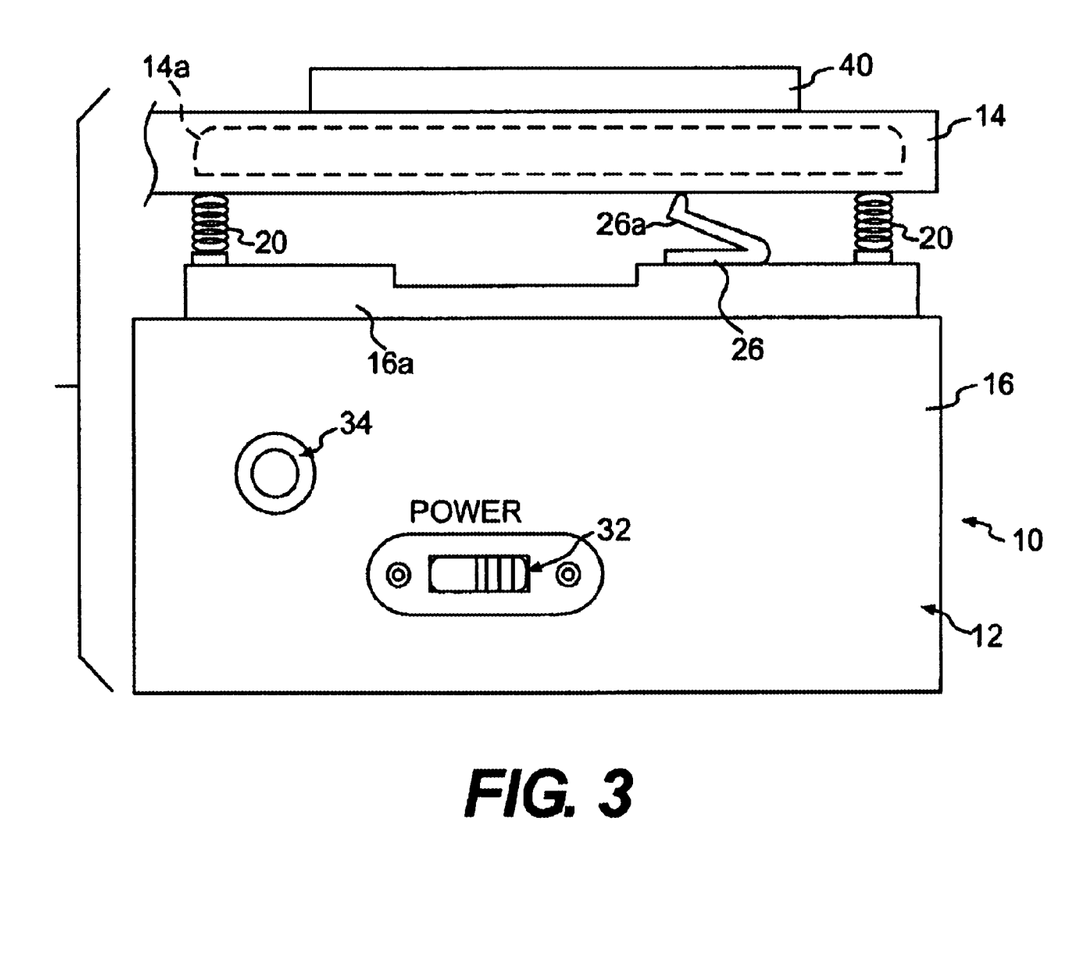
FIG. 3 is a side elevational view of a preferred embodiment of the animal communication device of the present invention.
Figure 4:
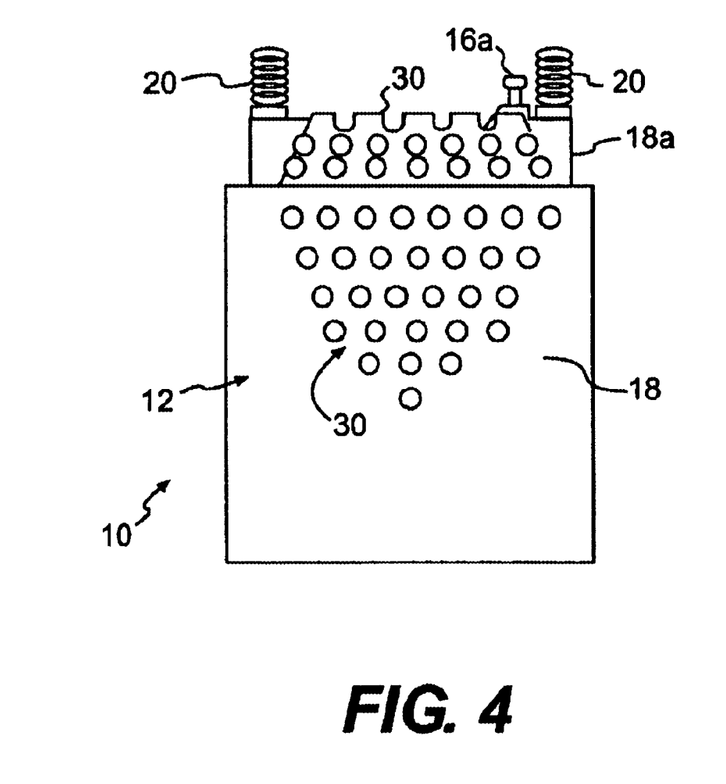
FIGS. 4 and 5 are end elevational views of the device of FIG. 3.
Figure 5:
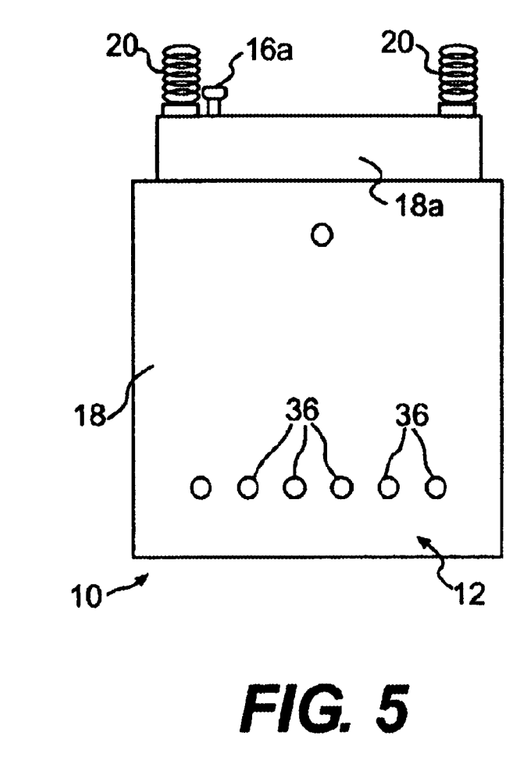
Figure 6:
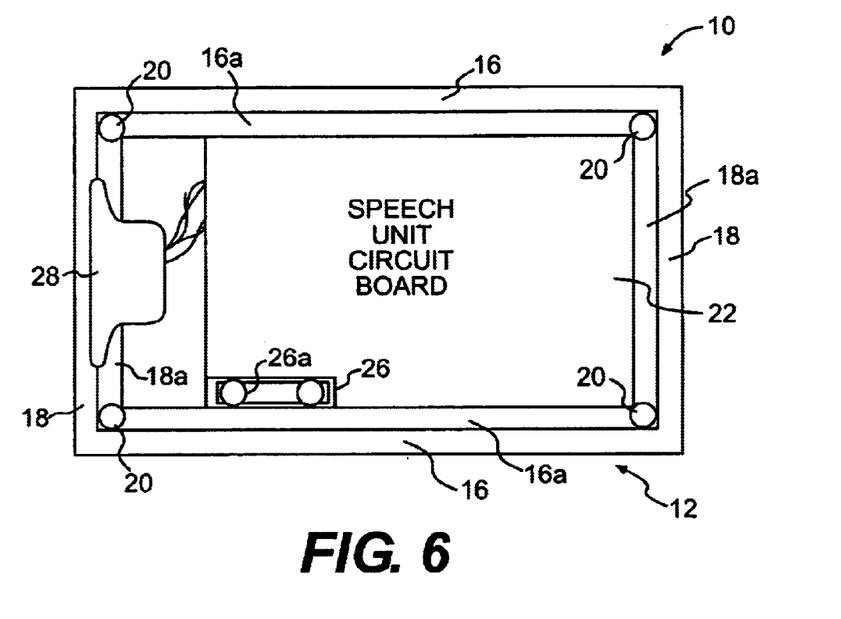
FIG. 6 is a top plan view of the device of FIG. 3, with the cover removed.

As is best seen in FIGS. 3 to 6, the side and end walls 16, 18 of housing 12 include upper portions of reduced thickness, denoted 16a and 18a, which are received in an opening 14a of cover 14 (see FIG. 3). Upstanding coil springs 20 are mounted at the four corners of wall portions 16a, 18a, as is best seen in FIG. 6. Thus, cover 14 rests on springs 20 and is normally supported thereby in spaced relation to housing 12, as indicated in dashed lines in FIG. 7.

Housing 12 serves to house a speech unit circuit board 22 which supports a speech unit 24 (see FIG. 12) and associated circuitry described below. Also mounted on circuit board 22 is a microswitch 26 including a leaf spring switch element or switch arm 26a that is adapted to be engaged by cover 12 to activate microswitch 26 when cover 14 is depressed. In other words, depressing cover 14 against the force of coil springs 20 causes the inside bottom surface of recess 14a of cover 14 to engage switch element 26a and activate switch 26 and thus trigger speech unit 24, described in more detail below.

As indicated in FIG. 6, housing 12 also contains a speaker 28 which is supported in one of the end walls 18 and which is electrically connected to speech unit 24 so as to broadcast the output therefrom. As shown in FIG. 4, the corresponding end wall 18 and wall portion 18a include an array or pattern of sound transmitting openings 30 therein aligned with the speaker face. The cover 14 includes a similar pattern of aligned openings (not shown).

Figure 7:
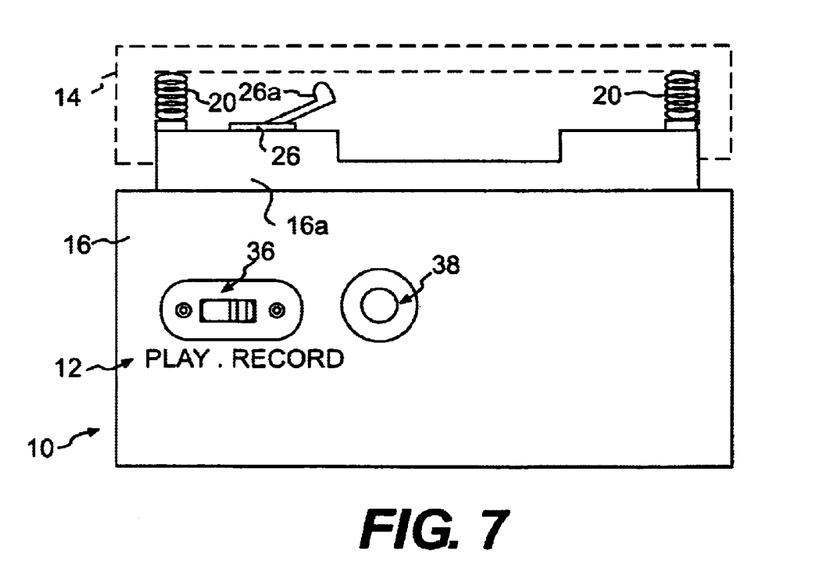
FIG. 7 is a side elevational view, from the opposite side of the device, of the device of FIG. 3.

As shown in FIG. 3, a power switch 32, which controls switching of the device 10 on and off, and a DC input jack 34 are located in one side wall 16 of housing 12. Similarly, as shown in FIG. 7, the opposite side wall 16 includes a play-record control switch 36 and a microphone jack 38. Again, these are part of the speech unit system described below in connection with FIG. 12.

As shown in FIG. 5, a series of connection holes 38 are provided in the end wall 18 of housing 12 opposite that at which speaker 28 is located. The purpose of these holes 38 is described in more detail below in relation to FIGS. 11, 12 and 13.

Figure 1:
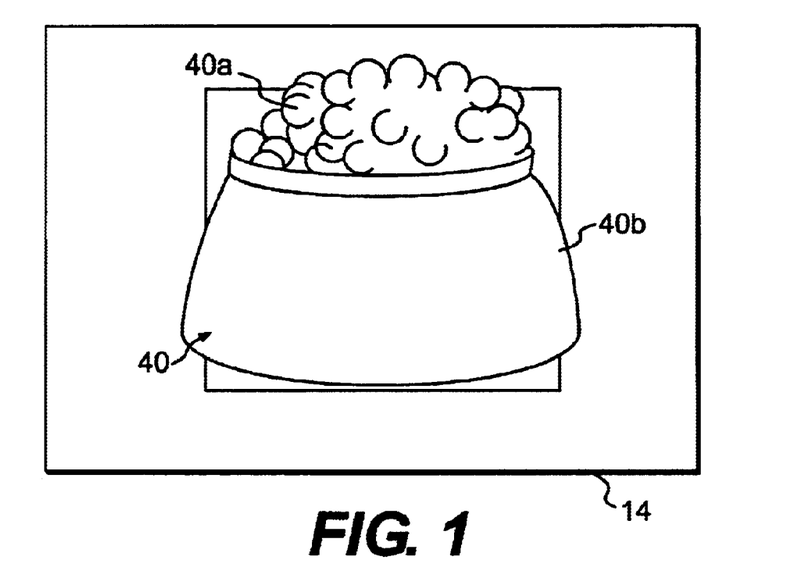
FIG. 1 is a top plan view of a first preferred embodiment of the animal communication device of the invention.

Referring again to FIG. 1, the cover 14 of housing 12 includes a raised portion or panel 40 on the upper surface thereof. In the embodiment of FIG. 1, panel 40 is shaped and inscribed or otherwise designed so as to represent a bowl of pet (dog) food. In general, panel 40 is preferably in the form of a three dimensional cutout visually depicting, in pictorial form, an item of appeal to the pet in question, or one that associated with a particular activity or need of the pet. Thus, in the embodiment of FIG. 1, the bowl of food is used to effect the audio response, in the form of a message recorded by speech unit 24, and broadcast when cover 14 is depressed to activate microswitch 26, that "I am hungry." In the embodiment illustrated in FIG. 2, in which panel 42 depicts a tree, the corresponding message is "I want to go out." In this instance, and some other instances, the pictorial representation itself may not be that meaningful to the pet (i.e., the depiction of a tree or a fire hydrant would mean much more to the dog owner than to the pet dog) and the association may have to be learned by the pet. Moreover, as discussed below, at least one further prompting stimulus is provided.

Figure 2:
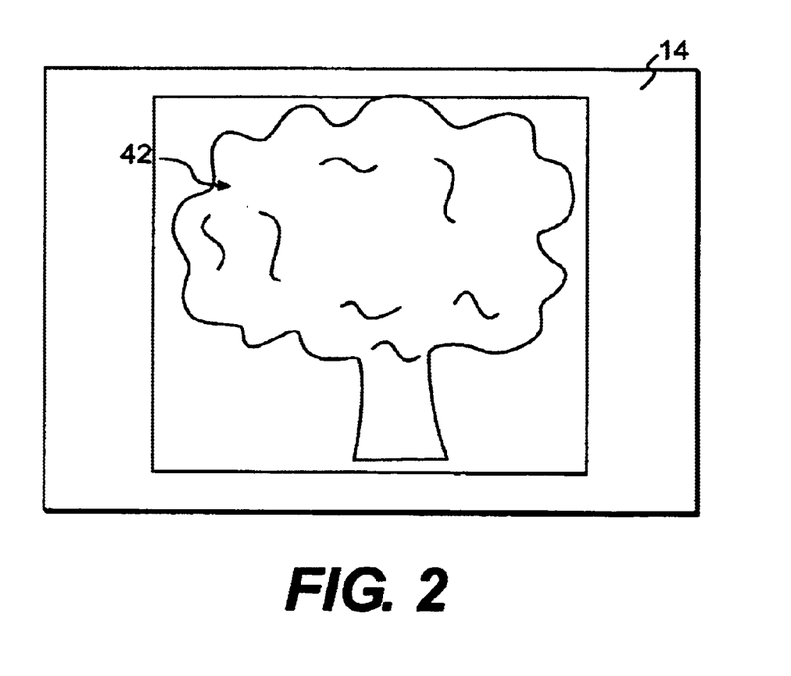
FIG. 2 is a top plan view of an alternative preferred embodiment of the device of FIG. 1.

In addition to the particular shape, a particular color can also be provided which the pet or other animal can associate with the specific message. Further, the panel 40 or 42 preferably includes at least a part thereof of a particular texture that the animal associates with the message. For example, for panel 40, the texture may be that of dog food, of a bowl as indicated at 40b, or of both.

Figure 8:
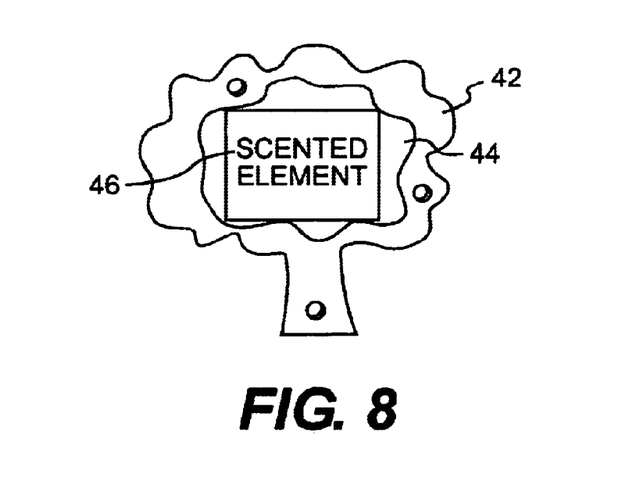
FIG. 8 is a bottom plan view of the panel of FIG. 2 showing a scented element disposed therein.

In addition, the panel 40 or 42 preferably includes a compartment therein, indicated at 44 in FIG. 8 for panel 42, for containing a scented element 46 for producing a distinct smell that the animal normally associates with, or can learn to associate with, the recorded message in question. The scented element 46 can comprise a scented wax, a scented oil or other chemical extract on a cloth, or another suitable porous and/or absorbent carrier, a scent absorbent backing strip or the like.

Figure 9:
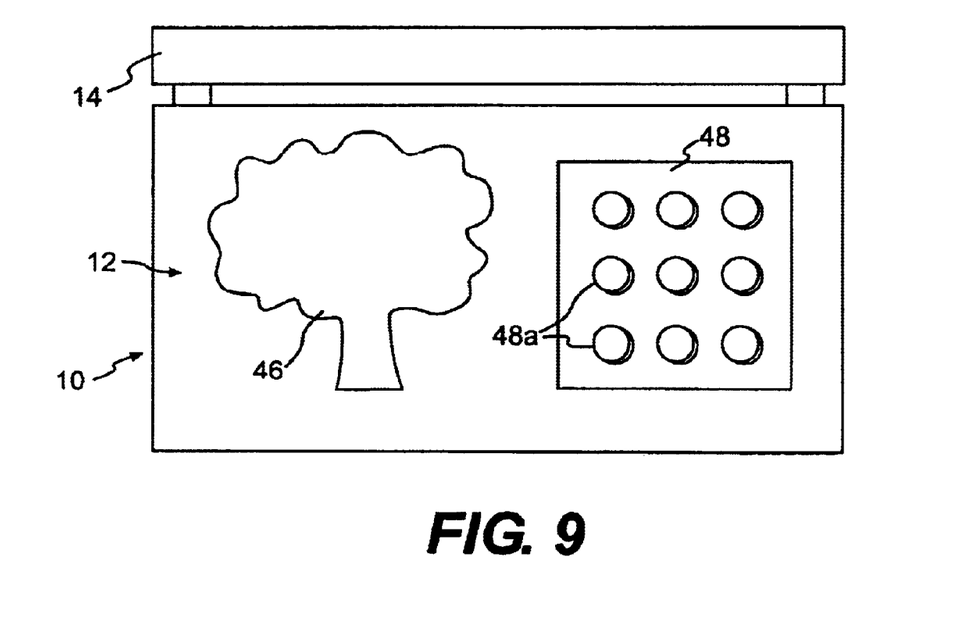
FIG. 9 is a side elevational view of an animal communication device in accordance with a further embodiment of the invention.
Figure 10:
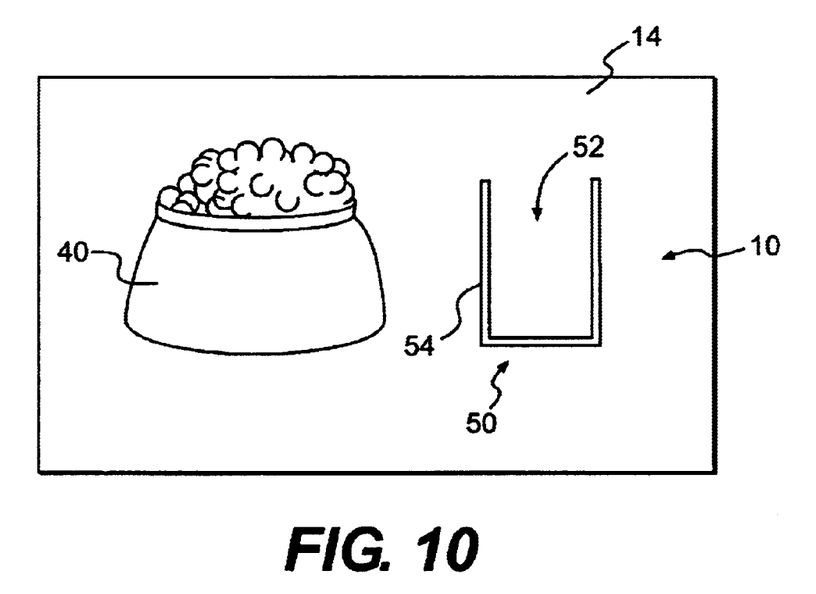
FIG. 10 is a top plan view of yet another embodiment of the invention.

Finally, the sense of taste can also be employed by, e.g., affixing, to the device 10, a taste element (not shown in FIGS. 1 and 2) providing a unique taste. The taste element can be provided on the surface of panel 40 or 42 or elsewhere on housing 12. In the latter regard it will be noted that although the sense stimulating element is preferably disposed on the panel to be depressed, as in each of the instances described above, this is not necessary and such an arrangement may not always be convenient. Thus, as shown in FIG. 9, in a different configuration, a visual cutout or panel 46, corresponding to panel 42 of FIGS. 2 and 8, can be located on the side of the housing 12 and a scented element 48, including scent release holes 48a, may be provided on housing 12 adjacent to panel 46. Further, sense stimulating elements are located on cover 14 adjacent to the panel 40 (or 42) rather than being part thereof. Thus, as shown in FIG. 9, the taste element, which is denoted 50 in FIG. 10, can be located on the upper surface of cover 14 adjacent to the cutout panel 40 (or 42). The taste element 50 can comprise a taste member 52 in the form of a slide or the like which is treated with an artificial, chemically simulated, taste-invoking composition or agent and which is removably received in a slide holder 54. It will be appreciated that there can be problems with simulating taste. For example, a dog owner would, of course, like to avoid a situation where the pet dog attempts to chew the taste element 50 off of the device 10, and thus, the taste simulated is preferably reasonably subtle and a relatively rugged protective housing or mounting, such as slide holder 54, is preferably provided. Further, by making the taste element 50 replaceable, the problem of the taste element losing its taste over time can be combated.

A stimulus based on the sense of sound can also be provided. A battery-powered sound source similar to a conventional noise maker can be used for this purpose. The relationship between the sound emitted and the act to be stimulated (e.g., I am hungry) may have to be learned. This is particularly true where the sound is to be continuously broadcast in that an otherwise suitable sound (e.g., "treat") may become irritating to the pet owner when repeated over and over.

Figure 11:
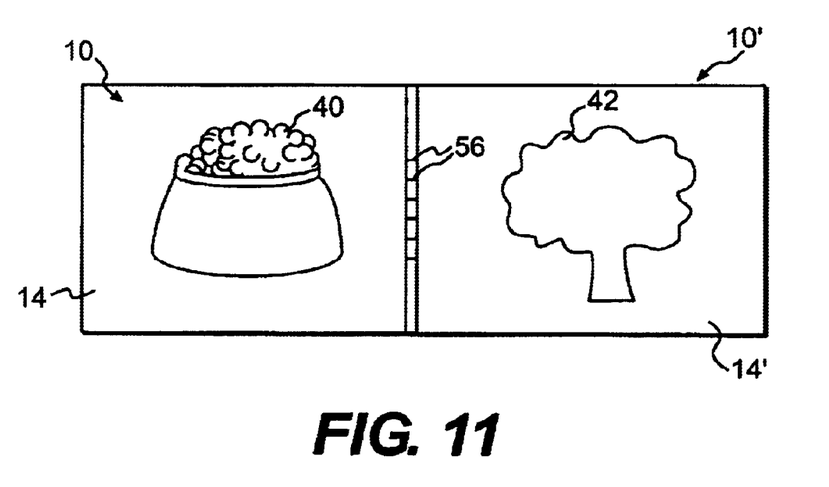
FIG. 11 is a top plan view showing two devices, corresponding to those shown in FIGS. 1 and 2, connected to one another.

It will be appreciated that all of the sense stimulants provided should work together. Thus, in the first preferred implementation of the embodiment shown in FIG. 1, depicting the bowl of e.g., dog food, the smell or scent would be that of dog food or other food, the feel or texture would be that of the food or of a dog dish or bowl, or both, and the taste would be suggestive of the taste of the food. Similarly, in a preferred implementation of the embodiment of FIG. 2, depicting a tree, the scent could be the odor of pine, cedar or other wood, and the texture or texturized surface provided could have the feel of bark. A related taste could also be provided although taste would obviously be less suggestive and hence less important here.

Where it is desired for a pet or other animal to generate more than one message (e.g., to generate a message in addition to "I am hungry," e.g., the additional message that "I want to go out"), two or more units or devices can be connected together as shown in FIG. 11. Electrical connectors 56 provide a connection between the circuits of the two units which are denoted 10 and 10' in FIG. 11. Of course, three or more units with different messages can be connected together if desired. The electrical circuits for the two individual units 10 and 10' are described below.

Figure 12:
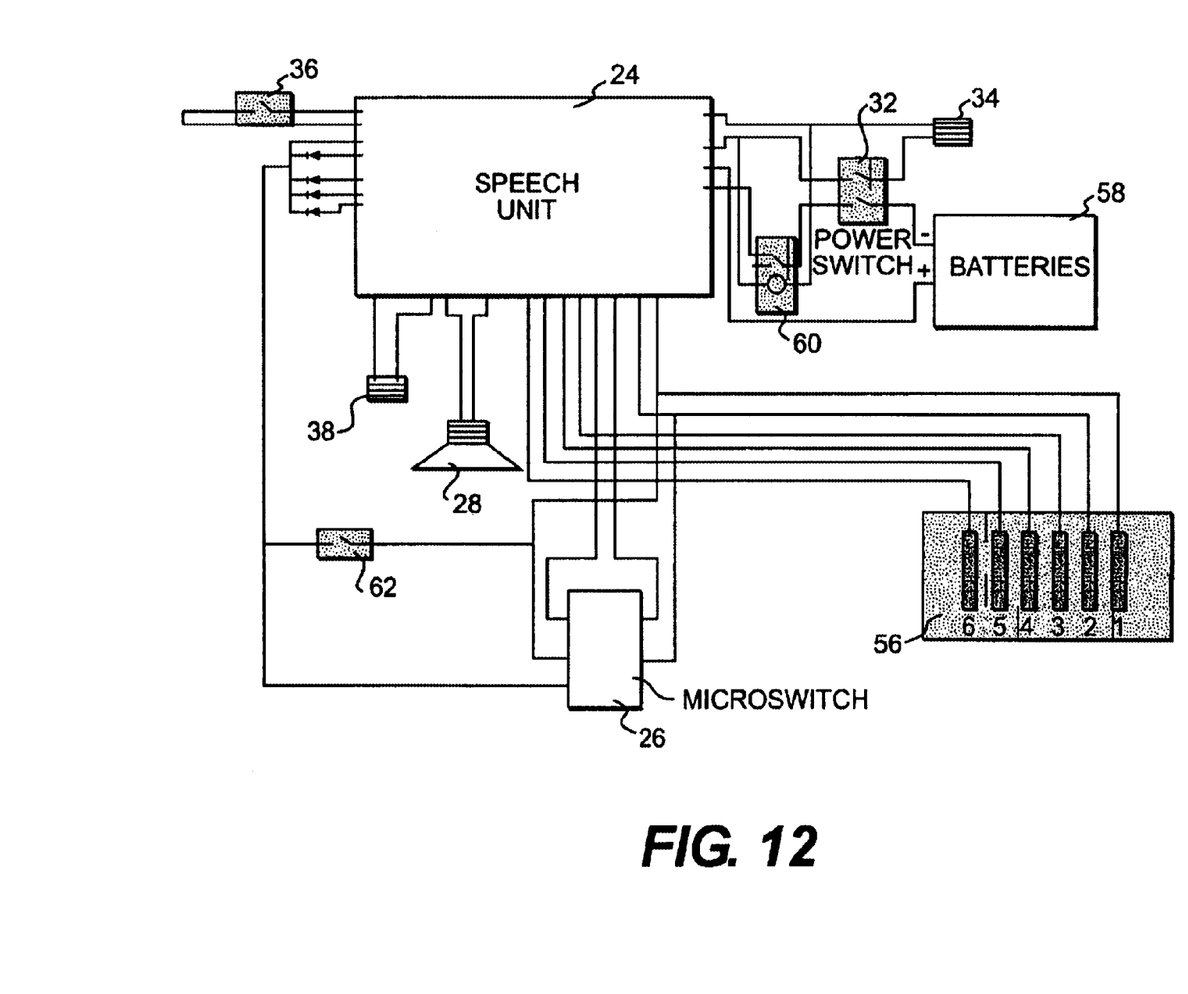
FIG. 12 is a schematic circuit diagram of a speech unit and associated circuitry in accordance with one preferred embodiment of the present invention.

Referring to FIG. 12, there is shown a schematic circuit diagram for the electrical circuit of the basic device or unit 10. The electrical circuit includes a battery power source (batteries) 58 which is housed within housing 12, preferably behind a sliding door or the like (not shown). Jack 34, which was described above, is used to enable the unit 10 to be plugged into a conventional A.C. wall outlet through a suitable A.C. adapter (not shown). When unit 10 is plugged into the wall, batteries 58 are unnecessary and are temporarily disconnected by an auxiliary switch 60.

A control switch 62 is connected between a series of outputs from speech unit 24 and the electrical connections from speech unit 24 and the connectors 56 for, in the illustrated embodiment, five other peripheral or auxiliary units. Control switch 62, when activated, provides a connection to the first auxiliary unit (identified as unit 2 where the main unit is unit 2). Speaker 28, power switch 32, jack 34, play-record switch 36, and microphone jack 38 are all connected as shown to speech unit 24. It will be appreciated that the unit 10 can include a built-in microphone instead of the jack 38 for an external microphone.

In exemplary embodiment, the speech unit or module 24 comprises an Electronic Record/Playback Module, K4400, Velleman kit. Speech unit 24 is located in the basic or main module or unit 10, and thus all of the peripheral or auxiliary units (corresponding, e.g., to unit 10' of FIG. 11) will share speech module 24. In the illustrated embodiment, the speech unit 24 is used with a standard tape recorder microphone (not shown) plugged into jack 38, although, as indicated above, an internal microphone can also be used. In use, the microphone is used in conjunction with the speech unit 24 to record a suitable message which logically corresponds to the physically perceivable attributes associated with the particular unit or device 10. For example, as described above, for the embodiment of FIG. 1 wherein raised panel 40 is shaped and designed to simulate a dog bowl with dog food and, e.g., the scent of dog food is also simulated, the message that would be recorded would be "I am hungry" or something similar. Of course, a prerecorded message can be used but it adds to the appeal of the device to provide a capability such that, e.g., the actual voice of the dog's master is recorded, in the example under consideration here. Of course, further, different voices can be used for the message as the pet owner desires. In another example, as discussed hereinbefore, for the embodiment of FIG. 2, the message would be "I need to go out" or something similar.

Figure 13:
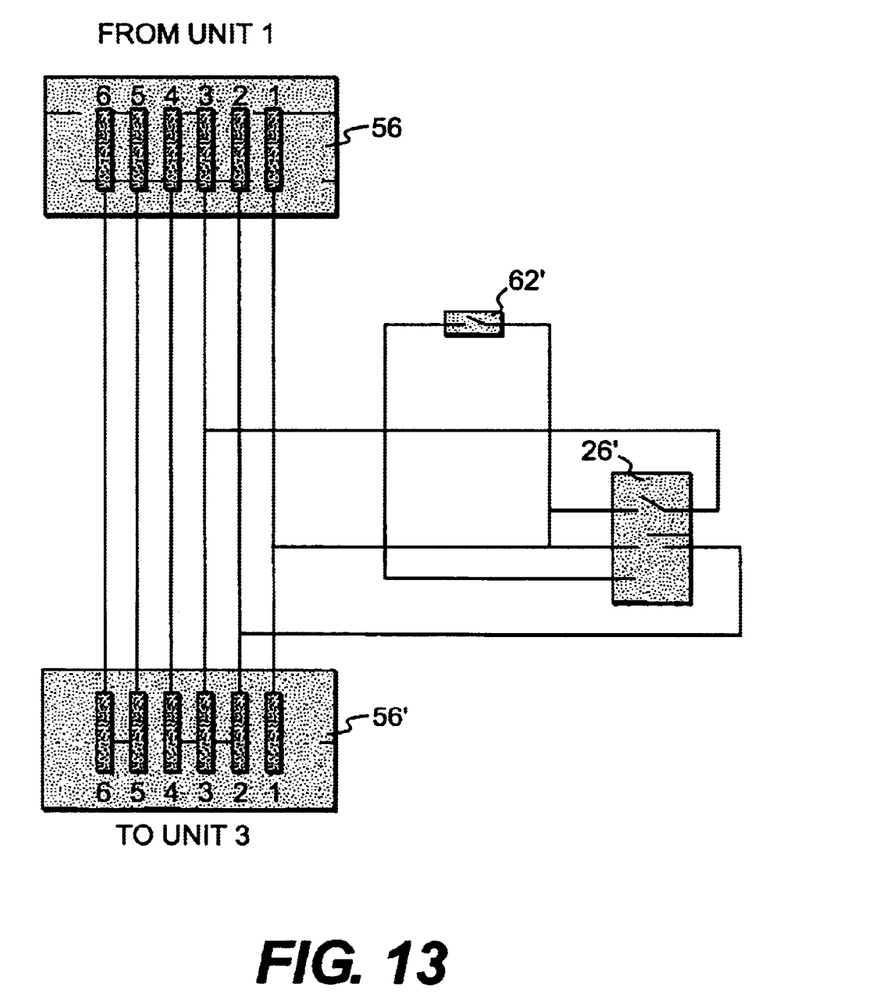
FIG. 13 is a schematic circuit diagram of the electrical circuitry of an auxiliary or peripheral communication device, including the electrical connection between two modules.

As was also indicated above, the main unit or module is plugged into the peripheral units or module by virtue of electrical connectors 56. It is noted that if more than the two units 10 and 10' shown in FIG. 11 are to be connected together, the units would be connected together in serial relationship. Referring to FIG. 13, the circuit diagram for peripheral unit 10' of FIG. 11 is shown. Because, as discussed above, the speech module 24 and associated circuitry are contained within main unit 10, the electrical circuitry for unit 10 is highly simplified and basically comprises a microswitch 26' (which is activated by depressing of the cover for unit 10' as described above for switch 26) and a control switch 62' which, when activated, completes the electrical connection to a third unit (unit 3) if a third unit is to be used.

Figure 14:
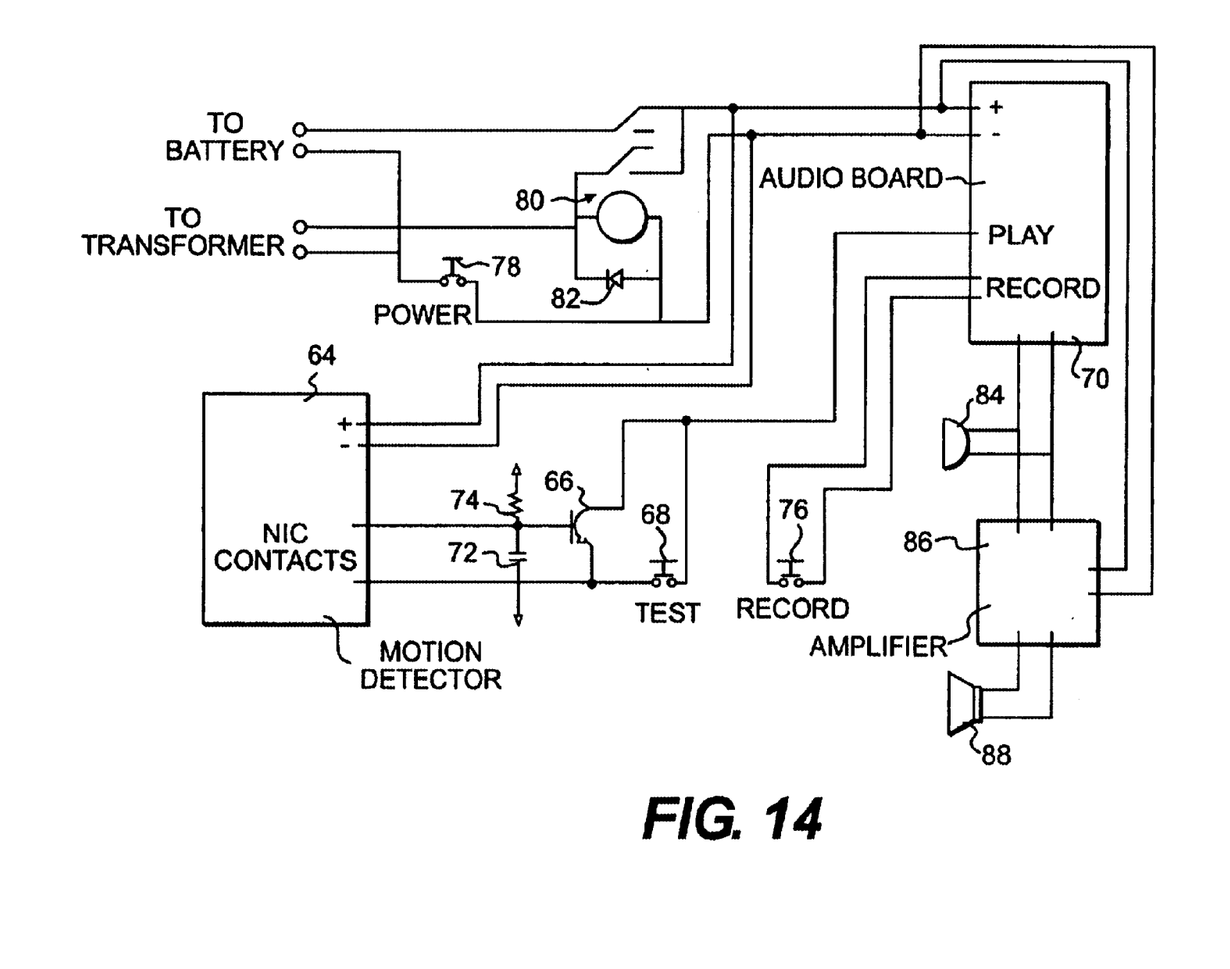
FIG. 14 is a schematic circuit diagram of a further embodiment of the invention employing a motion detector for activating the speech unit.

Referring to FIG. 14, this is shown a schematic diagram of the components and electrical circuitry for a further preferred embodiment of the invention. In this embodiment, the illustrated components would be housed in a module corresponding to that described in connection with the various embodiments previously discussed but actuation or activation of the unit is effected by means of a motion detector 64 rather than by depressing on the cover of the module as in the other embodiments. Accordingly, the cover of the module of the embodiment can be a simple cover without any support springs and without an associated microswitch, or, in another implementation, the module can simply be sealed. The use of motion detector 64 eliminates the need for the pet to depress the cover of module to provide actuation, a task that may not come naturally to and/or may be difficult to teach to, some pets. Thus, the motion detector 64 is set so that output beam produced thereby is interrupted by the pet nearing the module, i.e., when the pet, in approaching the module, breaks the beam. Motion detector 64 is conventional per se and in an exemplary embodiment comprises a miniature passive infrared (IR) motion detector such as the SPY-4 detector made by Visonic Ltd.

The overall circuitry of FIG. 14 is generally similar to that of FIG. 12, In brief, the normally closed contacts of motion detector 64 are connected through a transistor 66, and a "test" switch 68 connected in the emitter circuit of transistor 66, to the "play" input of an audio board or speech unit 70. A shunt capacitor 72 and a resistor 74 are connected as shown.

A "record" switch 76 is connected to the "record" inputs of audio board 70. As illustrated, power supply connections similar to those described above, and including a power switch 78, and an auxiliary switch 80 shunted by a diode 82, are connected to the power inputs of both motion detector 64 and audio board 70.

The output of audio board 70 is connected to a microphone 84 and to amplifier 86. The output of the latter is connected to a speaker 88.

As indicated above, the overall operation of this embodiment is similar to that of the previous embodiments, except that motion detector 64 is used to detect the presence of the pet and there is no requirement for (nor provision for) the pet to depress a switch to cause actuation of the speaker unit or audio board 70.

Although the invention has been described above in relation to preferred embodiments thereof, it will be understood by those skilled in the art that variations and modifications can be effected in these preferred embodiments without departing from the scope and spirit of the invention.

What is claimed:

1. An animal communication device for enabling a land animal to communicate with a human, said device comprising:
  a primary module comprising a housing and having associated therewith a plurality of physically perceivable attributes selected from the group consisting of sight, smell, sound, taste, and touch;
  a speech unit disposed within said housing, said speech unit comprising a playback device for storing and playing back a recorded message and a speaker for broadcasting said recorded message, said recorded message comprising a message to be communicated by the animal to a human listener and said message being related to said plurality of said physically receivable attributes associated with the primary module; and
  a motion detector, connected to said speech unit and disposed within said housing, for activating said playback device to cause playing back of said message in response to detection of the animal.

2. The animal communication device of claim 1, further comprising a panel, said panel being disposed on an upper surface of said housing, and said panel having associated therewith at least one of said plurality of physically perceivable attributes.

3. The animal communication device of claim 2, wherein said panel is shaped and designed so as to present a sight stimulus.

4. The animal communication device of claim 3, wherein said panel incorporates a scented element providing a smell stimulus.

5. The animal communication device of claim 4, wherein said panel includes at least one textured portion providing a touch stimulus.

6. The animal communication device of claim 5 wherein said sight stimulus, said smell stimulus and said touch stimulus relate to a common animal-related request reflected in said message.

7. The animal communication device of claim 6 wherein said common request is the need to eat and a corresponding recorded message is played back responsive to detection of the animal.

8. The animal communication device of claim 6 wherein said common request is the need to go out and a corresponding message is played back responsive to detection of the animal.

9. The animal communication device of claim 2, wherein said panel includes at least one textured portion providing a touch stimulus.

10. The animal communication device of claim 1 wherein said plurality of physically perceivable attributes each relate to a common animal-related request and wherein said recorded message reflects said common request.

11. The animal communication device of claim 10 wherein said common request is the need to eat and a corresponding recorded message is played back responsive to detection of the animal.

12. The animal communication device of claim 10 wherein said common request is the need to go out and a corresponding message is played back responsive to detection of the animal.

13. The animal communication device of claim 1 further comprising means for enabling recording of a recorded message by said playback device in a record mode for playback by said playback device in a play mode.

14. The animal communication device of claim 13 further comprising a switch for controlling switching between said record mode and said playback mode.

15. The animal communication device of claim 1, further comprising a second module connected to the primary module, said second module having associated therewith a plurality of physically perceivable attributes selected from the group consisting of sight, smell, sound, taste, and touch, said physically perceivable attributes of said first and second modules relating to different animal-related themes.

16. An animal communication device for enabling an animal to communicate with a human, said device comprising:
- a primary module, comprising a housing and having associated therewith at least one physically perceivable attribute related to the need of the animal to eat and selected from the group consisting of sight, smell, sound, taste, and touch;
- a speech unit disposed within said housing, said speech unit comprising a playback device for storing and playing back a recorded message reflecting the need of the animal to eat and a speaker for broadcasting said recorded message; and
- a motion detector, connected to said speech unit and disposed within said housing, for activating said playback device to play said recorded message in response to detection of the animal.

17. An animal communication device for enabling an animal to communicate with a human comprising:
- a primary module, comprising a housing and having associated therewith at least one physically perceivable attribute related to the need of the animal to go out and selected from the group consisting of sight, smell, sound, taste, and touch;
- a speech unit disposed within said housing, said speech unit comprising a playback device for storing and playing back a recorded message reflecting the need of the animal to go out and a speaker for broadcasting said recorded message; and
- a motion detector, connected to said speech unit and disposed within said housing, for activating said playback device to play said recorded message in response to detection of the animal.

18. An animal communication device comprising:
- a primary module, comprising a housing and having associated therewith a plurality of physically perceivable attributes selected from the group consisting of sight, smell, sound, taste, and touch;
- a speech unit disposed within said housing, said speech unit comprising a playback device for storing and playing back a recorded message and a speaker for broadcasting said recorded message; and
- a motion detector, connected to said speech unit and disposed within said housing, for activating said playback device in response to detection of the animal,
- said device further comprising a second module connected to the primary module,
- said second module having associated therewith a plurality of physically perceivable attributes selected from the group consisting of sight, smell, sound, taste, and touch, and said physically perceivable attributes of said first and second modules relating to different animal-related themes.

19. An animal communication device for enabling an animal to communicate with a human, said device comprising:
- a primary module, comprising a housing and a housing cover mounted on said housing so as to be movable thereto in response to depression of the cover by the animal, said primary module having associated therewith at least one physically perceivable attribute related to the need of the animal to eat and selected from the group consisting of sight, smell, sound, taste, and touch;
- a speech unit disposed within said housing, said speech unit comprising a playback device for storing and playing back a recorded message reflecting the need of the animal to eat and a speaker for broadcasting said recorded message; and
- a control switch, connected to said speech unit and disposed within said housing so as to be actuated by depression of said cover by the animal, for activating said playback device to play said recorded message in response to depression of said housing cover by the animal.

* * * * *